United States Patent [19]

Hurley et al.

[11] Patent Number: 4,493,308
[45] Date of Patent: Jan. 15, 1985

[54] RADIANT/CONDUCTIVE BROILER

[75] Inventors: James R. Hurley, East Weymouth; Edward F. Searight, Harvard; Maurice Nunes, Arlington, all of Mass.

[73] Assignee: Thermo Electron Corporation, Waltham, Mass.

[21] Appl. No.: 366,026

[22] Filed: Apr. 6, 1982

[51] Int. Cl.³ ............................................. A47J 37/00
[52] U.S. Cl. ................................ 126/41 R; 126/19 R; 126/91 A; 126/390; 126/273 R; 432/209; 99/389; 99/445
[58] Field of Search ............... 126/19 R, 41 R, 273 R, 126/21 A, 91 A, 273.5, 378, 387, 390; 432/102, 120, 121, 174, 148, 202, 209; 165/104.21, 104.26; 99/385, 389, 401, 467, 445

[56] References Cited
U.S. PATENT DOCUMENTS

| 2,839,285 | 6/1958 | Vickers | 432/209 X |
|---|---|---|---|
| 3,791,372 | 2/1974 | Hatsopoulos et al. | 126/390 |
| 3,842,726 | 10/1974 | Fautz | 99/445 X |
| 3,853,112 | 12/1974 | Lazaridis et al. | 126/19 |
| 3,948,244 | 4/1976 | Lazaridis et al. | 126/19 R |
| 3,985,120 | 10/1976 | Lazaridis et al. | 126/378 |
| 4,383,823 | 5/1983 | Williams et al. | 432/148 |

*Primary Examiner*—Margaret A. Focarino
*Attorney, Agent, or Firm*—Herbert E. Messenger

[57] ABSTRACT

A broiler for cooking food products has an upper heating unit located in a spaced relationship from the food and a lower heating unit in a close heat transfer relationship with the food. The upper unit is preferably a U-shaped radiant fire tube with a gas-fired power burner mounted at one end as a heat source. Hot flue products exiting the radiant tube are directed to the lower heating unit which is preferably a heat pipe assembly with evaporator and condenser zones for a working fluid. In one form the condenser zone includes a generally flat wall portion with a cooking surface defining a set of upwardly facing grooves. In another form the condenser zone is a series of generally parallel pipes that extend under the food in a horizontal, mutually spaced relationship. A movable rack supports the food and moves it into and out of a cooking relationship with the condenser zone of the heat pipe assembly.

11 Claims, 9 Drawing Figures

RADIANT/CONDUCTIVE BROILER

BACKGROUND OF THE INVENTION

This invention relates in general to cooking apparatus. More specifically, it relates to a broiler for food products that cooks both sides of the food products simultaneously.

A wide variety of food broilers are known. Most of them, whether as a component of a stove for residential use or a commercial broiler for use in a restaurant, cook the food using either direct fired burners or high temperature radiant elements. Many direct fired units use gas as a fuel. Electrical resistance heating elements are common for radiant heat broiling. A significant advantage of electrical heating elements is that they can be arranged to cook both the upper and lower surfaces of the food simultaneously. This results in a faster cooking time, superior cooking, and avoids the necessity of turning the food while it cooks. Gas-fueled units can also be arranged to cook both sides of the food simultaneously, but in known units the upper and lower gas units are separately fired.

Also known are cooking appliances having an overfired broiler and a griddle located above the broiler. In such an arrangement waste heat from the radiant heating elements above the food in the broiler is used to heat the griddle above the broiler.

These known arrangements suffer from several disadvantages. One is that they are not fuel efficient because a major portion of the heat of combustion is simply exhausted. Also, many commercial units use excessive amounts of fuel because their burners have manual controls only and may be fired continuously over a work day of about ten hours even though their broilers actually cook food only a total of a few hours of the day. Another disadvantage is that direct fired units (e.g. most gas broilers), produce an uneven heating. Hot spots exist in the broiler which can result in overcooking or burning the food. In large commercial broilers, to control the uniformity of the heat throughout the cook zone requires multiple heating elements, temperature controls for each element, and with some systems, arrangements for circulating or distributing the heat energy. These problems are, of course, accentuated for broilers that cook the upper and lower sides of the food simultaneously. In fossil fuel fired units, another consideration is the level of emissions of toxic gases such as carbon monoxide and nitrogen oxides.

Cooking devices using heat pipes such as pans, ovens, deep fat fryers, griddles, and broilers are described in U.S. Pat. Nos. 3,791,372; 3,853,112, 3,948,244; 3,985,120; and 4,091,801, all of which are commonly assigned with the present application. In general these devices each have an enclosure for a working fluid that is divided into an evaporator zone in communication with a heat source and a condenser zone that transmits the latent heat of condensation of the working fluid to the food. They have certain advantages of heat pipe cooking such as a uniformity of temperature over the cooking surface or surfaces, central heating of one evaporator zone, and associated ecomonies and precision in the control of the cooking temperature. One of these patents, U.S. Pat. No. 3,853,112, describes a heat pipe cooking appliance where the condenser zone is a series of generally parallel "tubes" that each extend between hollow connecting tubes that in turn communicate with the evaporation zone. The food rests on the tubes. This "broiler", however, cooks only one side of the food product at a time.

It is therefore a principal object of this invention to provide a fossil-fuel fired broiler that cooks food products on opposite sides simultaneously with a resulting decrease in cooking time and improved quality of the cooked food.

Another principal object is to provide a broiler with the foregoing advantages that is fuel efficient and characterized by a comparatively low level of toxic gas emissions.

A further object of the invention is to provide a broiler with the foregoing advantages that cooks uniformly throughout a cooking region.

Yet another object of the invention is to provide a broiler that cooks a food product on opposite sides simultaneously while utilizing only one burner and one associated control system.

Another object of the invention is to provide a broiler with the foregoing advantages and whose control system automatically regulates burner firing to minimize fuel use.

Still another object of this invention is to provide a broiler with the foregoing advantages that can produce "sear lines" on the food product characteristic of conventional open flame cooking on a grill.

Another object is to provide a broiler with the foregoing advantages that is relatively easy to clean.

A still further object of the invention is to provide a broiler with the foregoing advantages that facilitates the movement of the food product to and from an optimal cooking location within the broiler.

SUMMARY OF THE INVENTION

A broiler for cooking food products has upper and lower heating units mounted in a vertically spaced relationship and preferably in an insulated housing. The broiler includes a single heat source such as a gas-fired power burner to furnish a flow of high temperature combustion gases to the upper heating unit. The upper unit uses a portion of the thermal energy provided by the burner to cook the upper surface of the food by radiant heating. A connecting conduit directs flue products exiting the upper unit to a lower heating unit which is preferably a heat pipe assembly. In the heat pipe assembly a substantial portion of the thermal energy remaining in the flue products is transferred to an evaporator zone and then to a condenser zone for cooking the lower surface of the food. The flue products then flow through an exhaust, but at a relatively low temperature.

The upper heating unit is preferably a radiant fire tube that is configured and dimensioned to develop a generally uniform cooking temperature at the upper food surface or surfaces throughout the cooking region located above the condenser zone. A suitable such tube is stainless steel with a circular cross section and a generally U-shaped configuration lying in a plane parallel to the cooking region. The burner is connected to one end of the tube and the other outlet end feeds the flue products to the connecting conduit. The temperature of the radiant fire tube is at least 1000° F. and preferably about 1200° F.

The evaporator zone of the lower heat pipe assembly includes a structure that transmits the flue products from the connecting conduit to the exhaust while promoting an efficient heat transfer to a working fluid held in the heat pipe assembly. In the preferred form, this structure has a nested tube configuration with an inner tube connected to the in-flow and having a set of perforations along its length to produce a plurality of jets of the flue products that strike the interior surface of an outer tube which is connected to the exhaust. This structure is a heat source for evaporating the working fluid which thereafter condenses in a zone defined either by a horizontally extending wall spaced immediately below the cooking region or by a set of small diameter condenser tubes. The wall portion preferably includes a cooking surface defining a set of upwardly facing grooves so that the surface can both support the food product during cooking and impart "sear lines" to the cooked food. In either form, the heat pipe assembly efficiently converts residual thermal energy in the flue products into cooking heat. A typical exit temperature for the flue product at the exhaust is 750° F. which represents a significantly more efficient fuel use than heretofore available in gas-fired broilers.

The broiler may also include a rack or grid that is pivotally mounted for movement between a cooking position where the food rests on the condenser element or elements, and a transfer position where the food is clear of the condenser zone and the rack extends at least partially outside the broiler housing. Alternatively, no rack is provided but the heat pipe assembly, including its cooking surface, is movable between cooking and transfer positions.

These and other features and objects of the present invention will be more fully understood from the following detailed descriptions which should be read in light of the accompanying drawings.

DETAILED DESCRIPTION OF THE PREFERRED EMBODIMENTS

Figure 1:
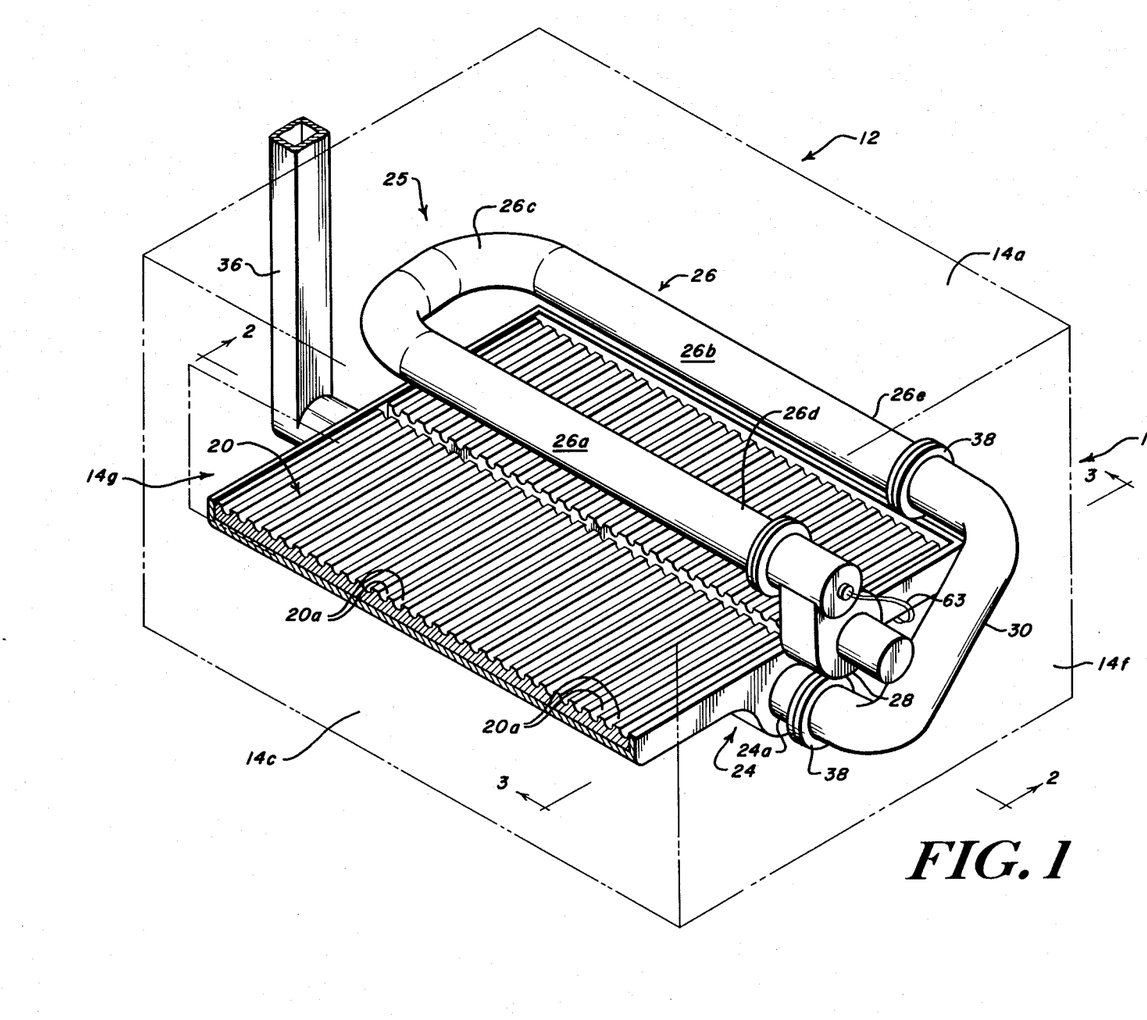
FIG. 1 is a simplified view in perspective of a heat pipe broiler constructed according to the present invention with the housing shown in phantom and the movable rack not shown.
Figure 2:
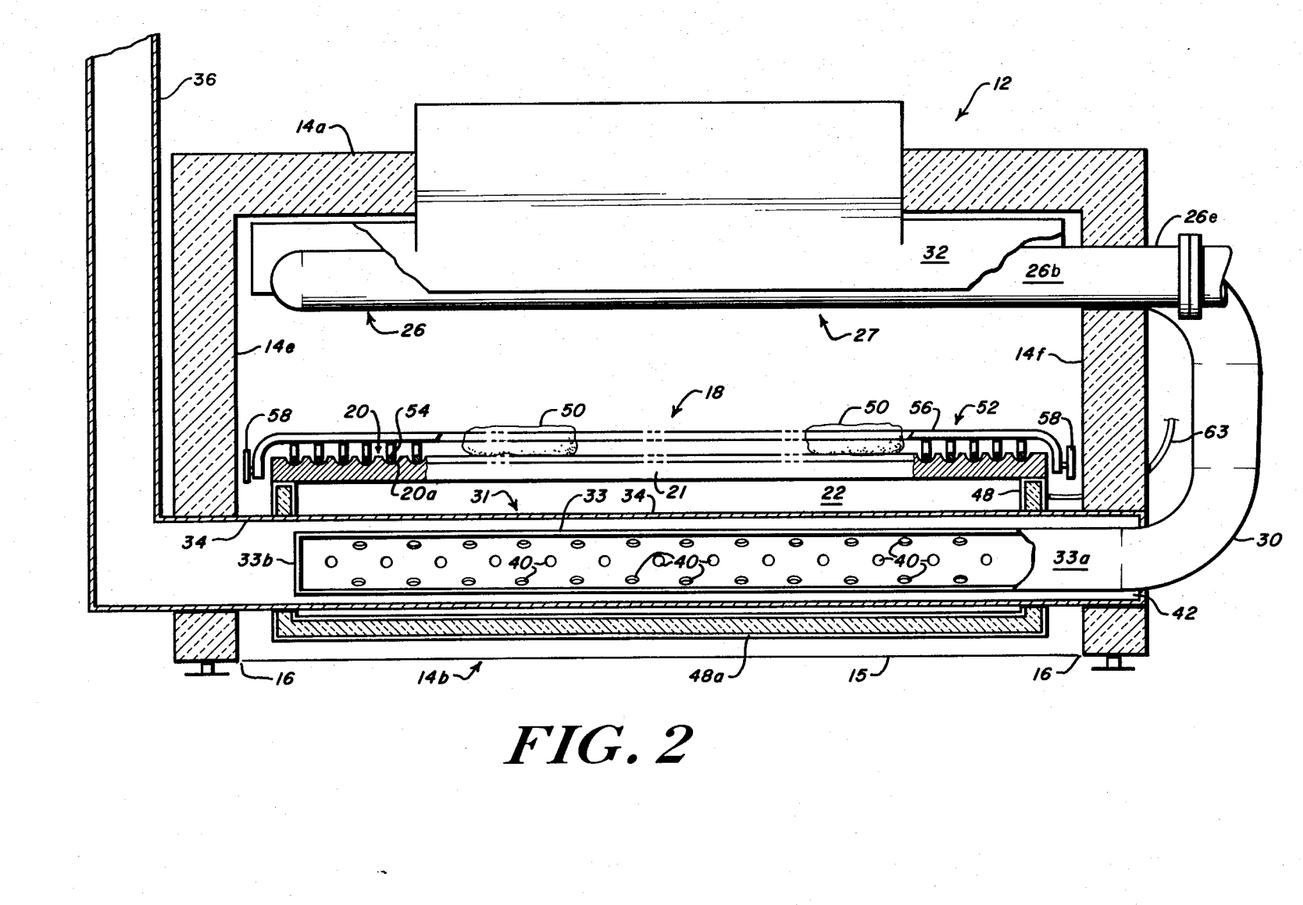
FIG. 2 is a more detailed view in vertical section taken along the line 2—2 in FIG. 1 and partly in side elevation.
Figure 3:
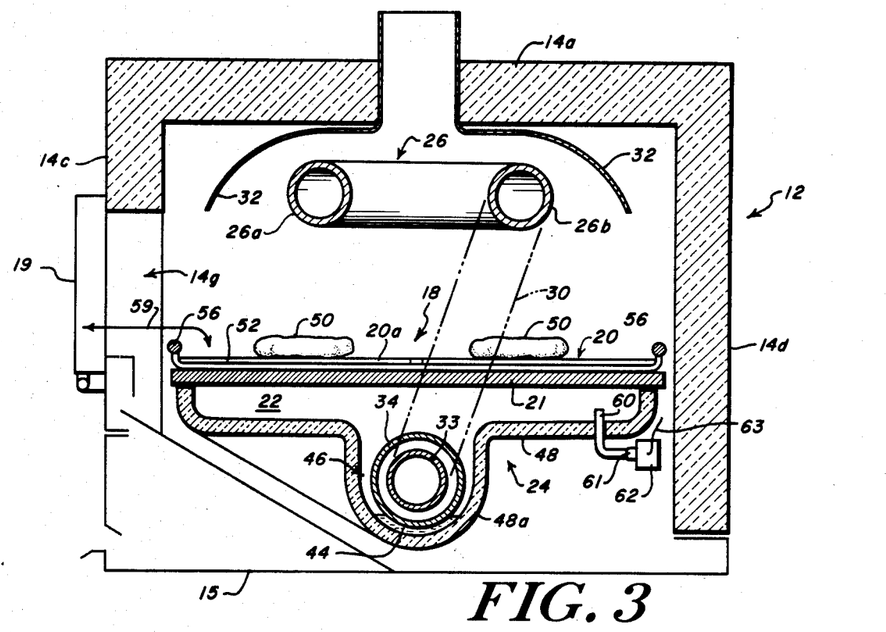
FIG. 3 is a detailed view taken along the line 3—3 in FIG. 1.

FIGS. 1-3 illustrate a preferred embodiment of a broiler 12 according to the present invention. The broiler 12 has a generally rectangular, box-like housing 14 including a top wall 14a, a bottom wall 14b, a front wall 14c, a rear wall 14d, and left and right side walls 14e and 14f, respectively. All of the housing walls except the bottom wall 14b preferably contain an insulating material. The bottom wall 14b is primarily an upwardly facing drip pan 15 mounted on brackets 16, 16 to permit a sliding removal of the drip pan. The front wall 14c of the housing has a generally rectangular opening 14g which allows access to a cooking region 18 through a door 19 (FIG. 3). A generally planar lower cooking surface 20 is defined by a wall 21 of a condenser zone 22 of a heat pipe assembly 24. The cooking region 18 is generally coextensive with and immediately above the surface 20.

A radiant fire tube having one or more tube sections aligned in a plane generally parallel to the cooking surface 20 constitutes a principal element of an upper heating unit 25 for cooking by radiant heat the upper surface of food products resting on the surface 20. The tube sections preferably form either a U-shaped tube 26 providing double-pass radiant heating or a serpentine-shaped tube (not shown) providing triple-pass (or higher multiple) radiant heating. As is best shown in FIG. 1, the tube 26 includes two straight sections 26a and 26b interconnected by a 180-degree elbow section 26c, and has an inlet end 26d which is connected to a power combustion burner 28. The burner 28 is mounted to the exterior of the side wall 14f and fires into the tube 26, producing burning along at least a major portion of the straight section 26a and then flue products which circulate through the remainder of the tube 26 to its exit end 26e. The burner 28 is preferably gas-fired and designed to burn efficiently in a manner which produces a low quantity of toxic gas emissions.

To provide rapid and efficient cooking, the pipe 26 should have a temperature of at least 1000° F. and preferably about 1200° F. To provide a generally uniform cooking temperature at the upper surface of the food products, the two generally straight portions 26a and 26b of the tube 26 are arranged symmetrically about the lateral centerline of the cooking surface 20 as is best seen in FIG. 3. The tube 26 preferably has a circular cross-section and a large diameter, for example 3 inches, to provide a large surface area for radiant heating. Also included are a pair of curved reflectors 32, 32 each associated with one of the straight sections of the conduit 26a and 26b to reflect upwardly radiated heat energy downwardly onto the food. A connecting conduit 30 transmits the flue products from the outlet 26e of the upper heating unit 25 to an inlet 24a of the lower heating unit.

The heat pipe assembly 24 includes (FIGS. 2 and 3) a set of nested or concentrically mounted pipes 33 and 34 which extract a significant portion of the residual thermal energy from the flue products exiting the tube 26 before they discharge to an exhaust 36 that extends vertically along the left side wall 14e. The pipes 33 and 34 together also form a conduit for the flue products. As is best seen in FIG. 2, the lower end of the connecting conduit 30 supplies the flue products to the inlet end 33a of the inner pipe 33. The ends of the connecting conduit 30 are sealed to the inlet 33a and to the outlet 26e by conventional gasket seals 38. The pipe 33 has a generally cylindrical configuration and extends substantially the length of the heating surface 20. Its side walls contain a number of generally evenly distributed apertures 40 which provide exit passages for the flue products from the interior of the pipe 33 to the interior of the surrounding pipe 34. The apertures 40 preferably have suitable dimensions and configuration to create a jet flow of the flue products as they pass through the apertures which in turn creates a turbulent fluid flow as the jets impinge on the interior surface of the pipe 34. This turbulence produces an efficient heat transfer at the walls of the pipe 34. The left-hand end, as shown, of the inner pipe 33 is sealed by a wall 33b and the right-hand end, as shown, of the outer pipe 34 is sealed by a sleeve of insulating material 42 which extends between the pipes 33 and 34. As a result, the flue products exit by flowing generally from right to left from the inlet 33a to the exhaust 36.

The heat transferred by the flue products to the pipe 34 vaporizes a working fluid 44 held in an evaporator zone 46 of the heat pipe assembly 24. A suitable working fluid is Dowtherm-A fluid, a mixture of diphenyl and diphenyl oxide available from the Dow Chemical Company in Midland, Michigan. The evaporator zone is defined principally by the pipes 33 and 34 together with a generally surrounding semi-cylindrical recess 48a in an insulated lower wall 48 of the heat pipe assembly 24. The wall 48, together with the generally flat heating surface and wall portion 21, forms a sealed enclosure for the working fluid 44. In particular, working fluid vaporized by the heated pipe 34 is conducted upwardly to the interior surface of the wall portion 21 where the vapor condenses and transfers its latent heat of vaporization to the cooking surface 20. The condensed working fluid collects on the upwardly facing surface of the lower wall 48 which is downwardly sloped so that the working fluid in its liquid form collects and flows into the recess 48a where it is revaporized. The heat pipe assembly 24 typically operates essentially isothermally, producing a cooking surface temperature which varies only about plus or minus 15° F. as compared to a variation of about plus or minus 100° F. for conventional broilers.

The heating system described above provides a two-sided cooking of food products 50 placed in the cooking region 18 while using a single gas-fired burner. The heating system also provides the advantages of heat pipe cooking and an extremely efficient use of the energy generated by the combustion in the burner 28. A significant feature of the present invention is that the separate upper and lower heating units, the tube 26 of the upper heating unit 25 and the heat pipe assembly 24 forming the lower heating unit are connected in series with respect to the flow of flue products from the burner to the exhaust so that the available heat of combustion is used primarily for cooking. The heat pipe assembly 24 preferably has approximately the same heat transfer rate as the upper radiant fire tube, a typical value being 30,000 BTU/hr. With the structure shown, for flue products exiting the radiant fire tube 26 at approximately 1950° F., the temperature of the flue products at the exhaust will be approximately 750° F. These values represent a flue loss of approximately 30 percent which is a marked improvement over the efficiency of conventional broilers which cook food products on opposite sides simultaneously, particularly fossil-fuel fired broilers.

As is shown in FIGS. 2 and 3, the broiler 12 may also include a rack assembly 52 which is composed primarily of a network of rod-like members 54 which are aligned in a mutually parallel fashion and connected between perpendicular support rods 56, 56 at their ends. The rods 54 nest in a corresponding set of grooves 20a formed in the upwardly facing surface of the wall portion 21. The rack 52 provides a convenient means for placing the food products 50 on, and removing them from, the lower cooking surface 20. More specifically, the rack 52 is pivotally mounted on hinges 58 so that a pulling force causes the grid to first move in a generally upward direction to lift the food products from the surface 20 and then to move in a generally horizontal direction toward or through the opening 14g. The closed or cooking position is shown in FIGS. 2 and 3. The general path of motion of the rack between the closed and open positions is indicated by the arrow 59 in FIG. 3. It should be noted that in the cooking position the rods 54 are fully nested within the grooves 20a. As a result, the food products rest directly on the cooking surface 20. More particularly, because the grooves 20a are in parallel rows, meat such as steaks cooked in the broiler 12 will have a set of "sear lines" characteristic of food cooked on a conventional open fire grill.

To minimize fuel usage, the burner 28 of the broiler 12 is controlled to fire only as needed to cook food or to furnish heat equal to the heat lost during stand-by (non-cooking) operation. A suitable system for achieving this control includes means for sensing the pressure or temperature of the working fluid within the heat pipe assembly 24 and a switch connected to the burner 28 for regulating its firing rate in accordance with the pressure or temperature sensed.

One preferred system, shown in schematic form in FIG. 3, includes a small tube 60 extending through the lower wall 48 of the heat pipe assembly 24 into the condenser zone 22 for sensing pressure of the vaporized working fluid therein. The tube 60 has an open end within the zone 22 and contains a pressure sensor 61 such as a bellows or diaphragm near its opposite end. A switch 62 in contact with the pressure sensor 61 is electrically connected to the burner 28 through a line 63 and operates to automatically control firing of the burner to maintain pressure of the heat pipe working fluid within desired limits. For example, after cooked food is removed from the broiler 12, continued firing of the burner 28 at steady-state (cooking) rates will cause pressure of the vaporized working fluid to rise beyond a typical operating value such as about one atmosphere. When the pressure attains a specified level or increases a specified amount such as one inch of mercury, the pressure sensor 61 activates the switch 62. The switch 62 in turn automatically shuts down the burner 28 or reduces its firing rate, for example to a standby rate of one third of steady-state firing rate. Thereafter, when working fluid pressures drop sufficiently, the pressure sensor 61 and switch 62 automatically initiate a higher firing rate of the burner 28.

Although it is currently preferred to control operation of the broiler by monitoring the pressure of the heat pipe working fluid and firing the burner as needed to maintain this pressure within predetermined limits, an alternative to pressure control is to control by sensing temperature of the working fluid and by firing the burner 28 to maintain desired temperature levels. Temperature control may be achieved by substituting for the tube 60 and the pressure sensor 61 a thermistor or thermocouple combined with a millivolt controller. Temperature of the vaporized fluid in the condenser zone 22 of the heat pipe assembly 24 may then be maintained, for example, within about two degrees of a typical operating temperature such as about 500° F. when Dowtherm fluid is used as a heat pipe working fluid.

Figure 4:
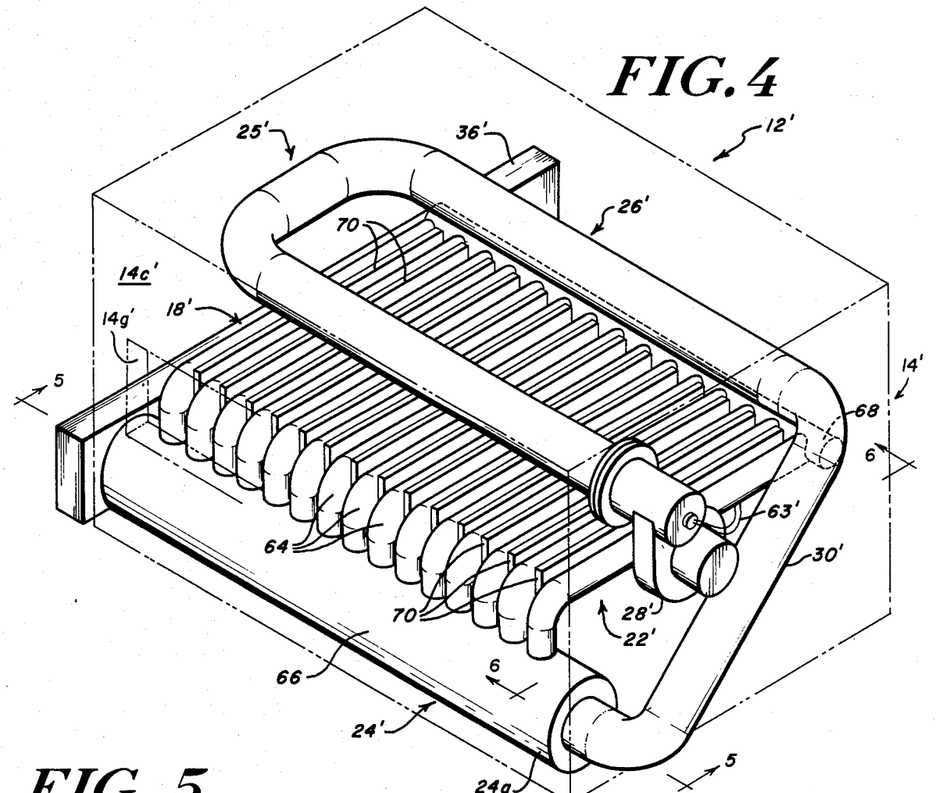
FIG. 4 is a simplified perspective view corresponding to FIG. 1 of an alternative embodiment of a heat pipe broiler according to the present invention.
Figure 5:
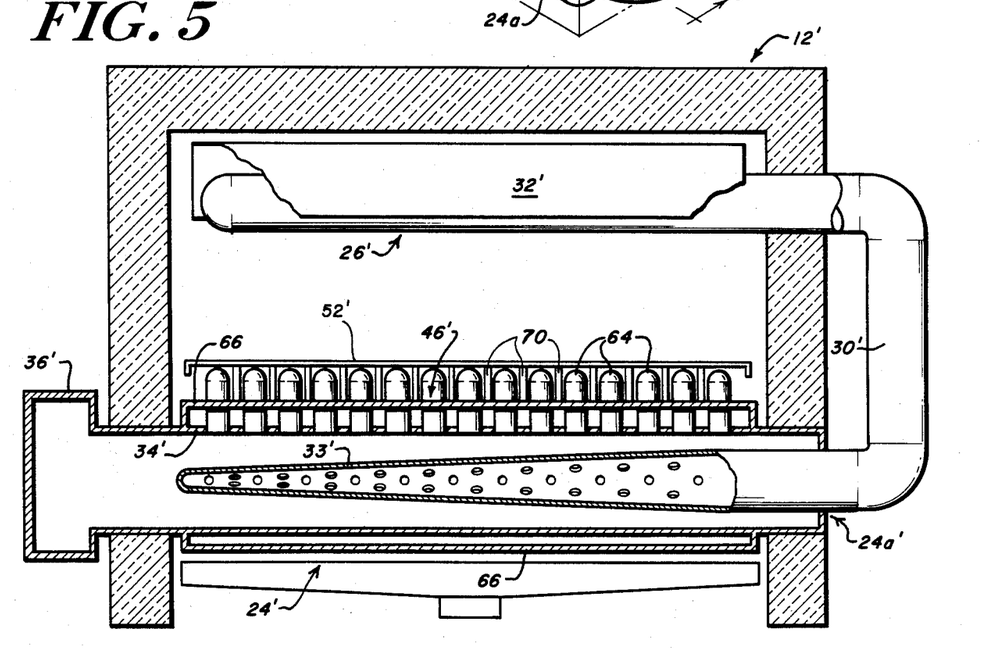
FIG. 5 is a view in vertical section corresponding to FIG. 2 taken along the line 5—5 in FIG. 4.
Figure 6:
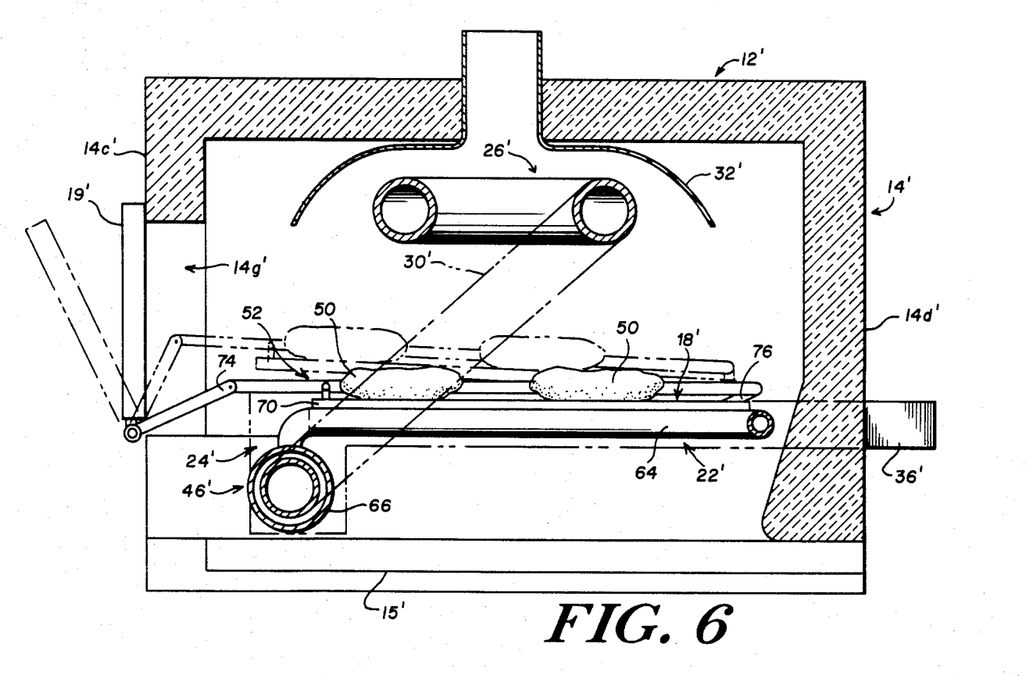
FIG. 6 is a view corresponding to FIG. 3 taken along the line 6—6 in FIG. 4.

FIGS. 4-6 show an alternative embodiment of the present invention, a broiler 12' that is generally the same as the broiler 12 described with reference to FIGS. 1-3 except for the construction of the lower heat pipe assembly 24' and the rack 52' (like parts being identified by the same reference number except with a prime). In the broiler 12' a burner 28' is operable to fire into a radiant fire tube 26' having a generally U-shaped configuration and arranged generally symmetrically with respect to a cooking region 18'. The flue products resulting from combustion exit the upper heating unit through a connecting conduit 30' which directs them to the inlet 24a' of a lower heat pipe assembly 24' which includes an evaporating zone 46' and a condensing zone 22'. A principal difference between the broiler 12' and the broiler 12 is that the condenser zone 22' is formed by a plurality of condensing pipes 64 which are aligned generally parallel to one another and are substantially coextensive with the lower surface of the cooking region 18'. Each pipe 64 has an end adjacent the front wall 14c' of the housing 14' that is angled downwardly and is in fluid communication with a common conduit 66 that holds and encloses a working fluid. The conduit 66 defines an evaporator section 46' which vaporizes working fluid to be carried upwardly into the tubes 64 where it condenses to provide cooking heat to the lower surface of food products in the cooking region 18'. The ends of the tube 64 opposite the conduit 66 are preferably connected to a manifold 68. The tubes 64 are preferably inclined slightly so that condensed working fluid flows by gravity from the manifold 68 and the tubes into the conduit 66 for revaporization. In addition, the tubes 64 may contain a capillary material to facilitate the return of the condensed working fluid to the evaporator zone.

Another difference in the broiler 12' is that the heat transfer pipes 33' and 34' (see FIG. 5) are located within and in a substantially concentric relationship with the conduit 66. In addition, the inner pipe 33' is tapered to a reduced diameter in the flow direction from the inlet 24a' of the heat pipe assembly to the exhaust 36'.

As shown in FIGS. 4 and 6, a rack 52' is formed by a series of grates 70 which are interposed between adjacent tubes 64 rather than a network of rods as described with reference to the broiler 12. The rack 52', however, is also mounted for articulated movement from a lowered cooking position to a raised and horizontally translated position in conjunction with the opening of a door 19' which covers the access opening 14g' (FIG. 6). The articulated mounting of the rack 52' includes a pivot arm 74 which is secured at the pivot point of the door 19' and rotates in conjunction with the door and a pivot arm 76 secured at the rear end 52' adjacent the rear wall 14d'. The raised position of the rack 52' associated with the door 19' being partly open is shown in phantom and the lowered or cooking position associated with the door 19' as being closed is shown in solid lines. It should be noted that disadvantage of the broiler 12' is that grease and spills from food products may flow onto the condenser tubes 64 and the grates 70 where they either accumulate or fall into the drip pan 15'. Grease and spills can become baked onto the tubes and grate and be difficult to remove since these members are not readily accessible, there is a relatively narrow space between adjoining tubes, and there is no convenient system for channeling the flow of grease and other fluids generated by cooking corresponding to the grooves 20a formed in the upper surface of the wall 21 of the broiler 12.

Figure 7:
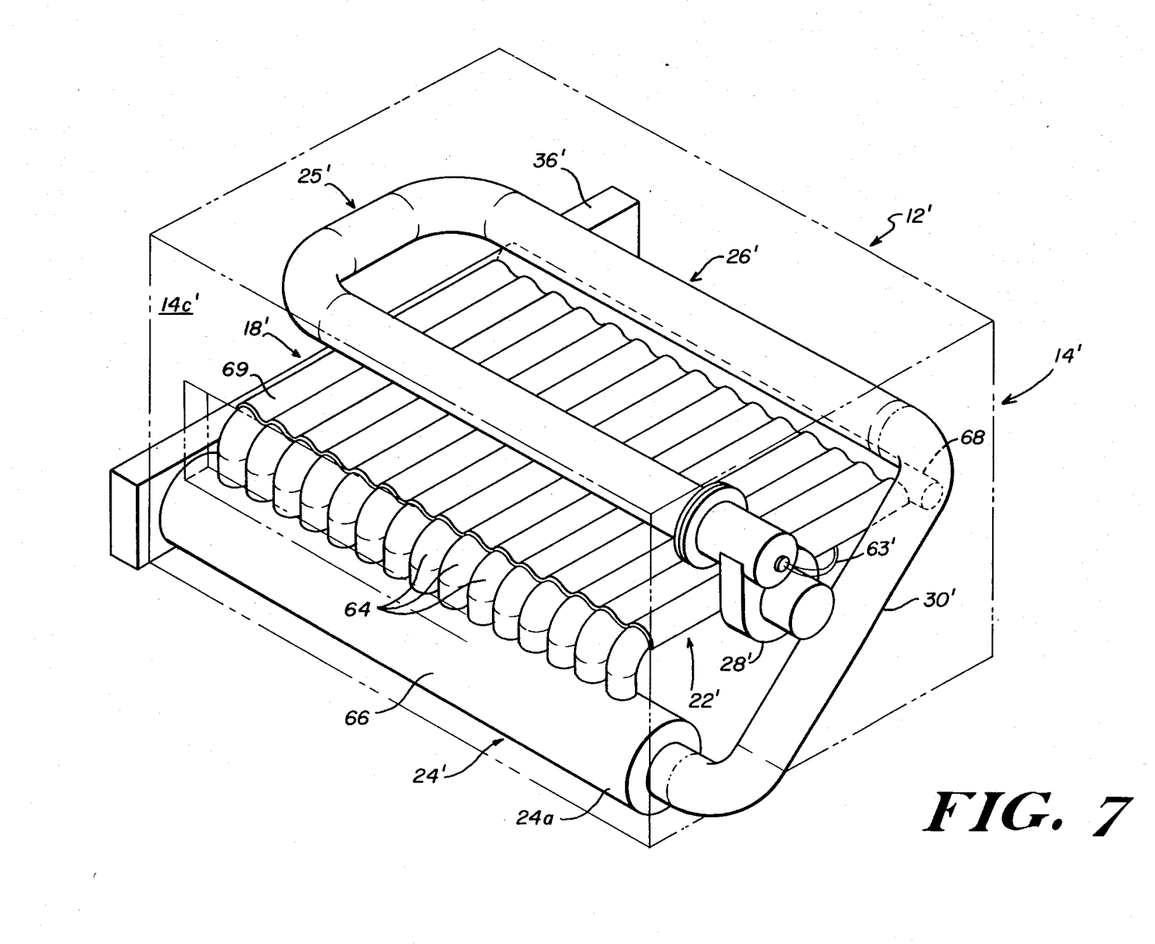
FIG. 7 is a simplified perspective view of a broiler similar to that shown in FIG. 4 but utilizing a corrugated sheet instead of a series of grates for supporting food products.

This disadvantage can, however, be overcome by substituting for the rack 52' a corrugated metal sheet 69 designed to conform to the contour of the heat pipe condenser tubes 64 and to contact these tubes as shown in FIG. 7. The sheet 69 acts to transfer heat from the pipes 64 to the food products and to collect grease and spills from food products. The grooves of the corrugated sheet may, if desired, be arranged to channel grease and other fluids to a point where they fall into the drip pan 15' without contacting the tubes 64. Also, the sheet 69 may, like the rack 52', be connected to a door 19' covering the access opening 14g' so that the sheet 69 is withdrawn as the door 19' is opened.

The broiler 12' operates in substantially the same manner as the broiler 12 and offers the same operating advantages. The burner 28' fires into the tube 26', producing high temperature burning along a substantial fraction of the tube and flue products which are, again, characterized by comparatively low toxic gas emissions. The flames and hot flue products circulate through the radiant fire tube 26' which transfers thermal energy for a commercial broiler in the range of 30,000 BTU/hr. The location of the tube 26' in conjunction with a reflector 32' produces a roughly uniform distribution of the radiant energy generated by the tube 26' over the upper surface of the food products 50 arrayed on the lower cooking surface in the region 18'. The flue products exiting the upper heating unit 25' defined principally by the radiant tube 26' are directed through the connecting conduit 30' to the heat pipe assembly 24' where a large percentage of the remaining thermal energy is converted into cooking heat that is transferred from the condenser tubes 64 to the lower surface of the food products 50 resting on the condenser tubes 64 and/or grates 70. The flue products exit the broiler through the exhaust 36' (which is oriented horizontally with an exit point at the rear wall 14d' of the broiler) at a relatively low temperature. Flue losses of the broiler 12' are about 30 percent.

Figure 8:
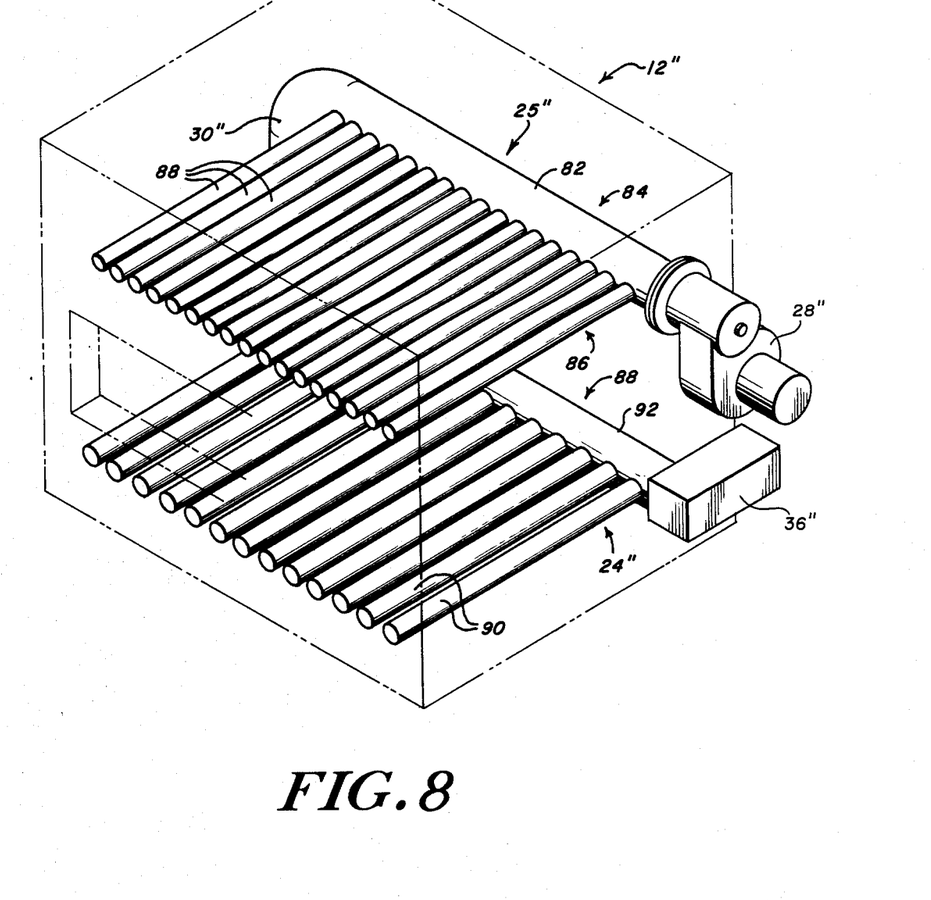
FIG. 8 is a simplified perspective view corresponding to FIG. 1 of another alternative embodiment of a heat pipe broiler according to the present invention.

FIG. 8 shows another embodiment of broiler constructed according to the present invention. This broiler 12" (again, like parts being assigned the same reference numbers as previously except with a double prime) has upper and lower heating units 25" and 24" that receive thermal energy from a common flow of hot gases generated in a single burner 28" which fires into a heat transfer pipe within a conduit 82 of the upper heating unit 25". A principal difference of this embodiment is that the upper heating unit 25" is a heat pipe assembly having an evaporator zone 84 and a condenser zone 86 defined by a set of generally parallel tubes 88 extending at right angles from the conduit 82 of the evaporator zone. The structural arrangement of the upper heat pipe assembly is generally similar to that described with reference to the heat pipe assembly 24' of the broiler 12', one exception being that each of the condenser tubes 88 terminates in a closed end rather than a common manifold tube. Of course, the working fluid in the heat pipe assembly 25" also will typically operate at a higher temperature then that of the assembly 24'. The lower heat pipe assembly 24" of the broiler 12" is also generally similar in construction to the heat pipe assembly of the broiler 12' except that condenser tubes 90 extending from a conduit 92 again terminate in closed end walls rather than a common manifold tube. A connecting conduit 30" extends between the evaporator zone 84 and the evaporator zone 88 of the lower heat pipe assembly 24" to direct flue products of the burner 28" to the evaporator zone 88, and an exhaust 36″ is connected to the outlet end of the evaporator zone 88 to carry exhaust gases away from the broiler 12″.

While the broiler 12″ has the advantages of a heat pipe assembly for cooking both the upper and lower faces of the food products, and is capable of achieving a more uniform heat distribution over the upper surface of the food products, it has the disadvantage that it is more costly to construct than the embodiments as shown and described with reference to broilers 12 and 12′ utilizing a radiant tube for the upper heating unit.

Figure 9:
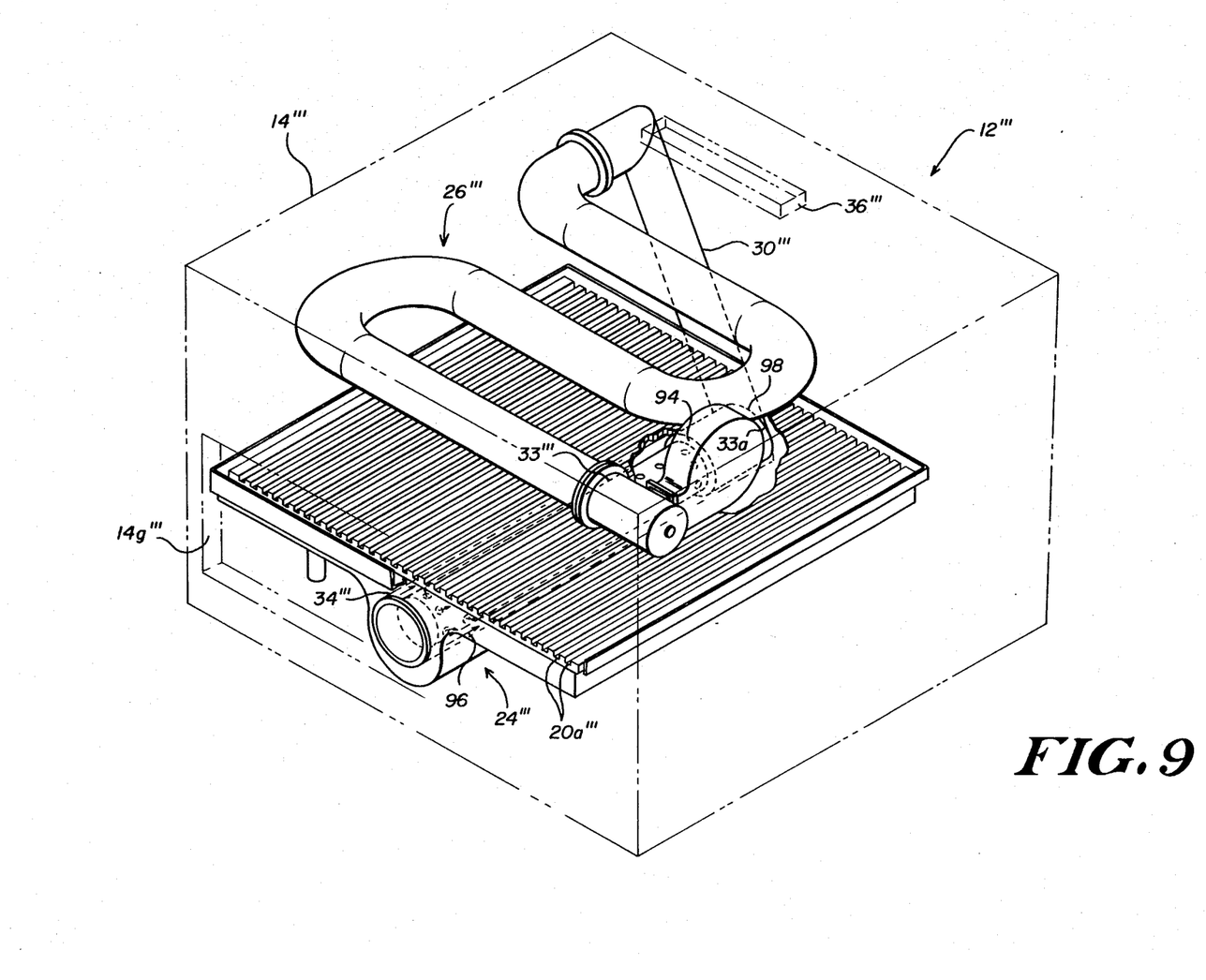
FIG. 9 is a simplified perspective view illustrating a heat pipe broiler according to the present invention in which no rack is used and the heat pipe assembly is movable.

Another broiler 12‴ within the scope of the present invention is illustrated in FIG. 9 wherein arrows are also included to indicate the direction of flow of combustion and flue products during operation. The broiler 12‴, like the broiler 12, has a radiant fire tube 26‴ (shown by way of example as a triple-pass tube but which could instead by U-shaped similar to the tube 26) above, and a heat pipe assembly 24‴ below, a cooking surface 20‴. However, the broiler 12‴ has no rack assembly for placing food products on and removing them from the cooking surface 20‴, but instead its heat pipe assembly 24‴ is movable in a generally horizontal direction from the closed or cooking position shown in FIG. 9 to a transfer position at least partially through the opening 14g‴ to facilitate loading and unloading of food products. To permit such movement the lower end of the connecting conduit 30‴ and the inlet end 33a‴ of the inner pipe 33‴ of the heat pipe assembly 24‴ are constructed with a slip joint 94 which allows the inner pipe 33‴ to slide into and out of sealing contact with the conduit 30‴. Also, movement of the heat pipe assembly 24‴ of the broiler 12‴ may be achieved in conjunction with the opening and closing of a door such as that shown at 19′ in FIG. 6 which covers the access opening 14g‴ and is suitably attached to the lateral edges of the heat pipe assembly 24‴. Opening of the door or movement of the pipe slip joint 94 may also activate a switch to shut off the burner 28‴ and the flow of combustion and flue products through the broiler 12‴.

Another difference between the broiler 12‴ and the broiler 12 is that the sealed and open ends of the outer pipe 34‴ of the broiler 12‴ are interchanged relative to those of the pipe 34 of the broiler 12 so that flue products of the tube 26‴ exit from the heat pipe assembly 24‴ by flowing generally counter to the direction of flow along the inner pipe 33‴, as indicated by the arrows 96. The open or discharge end 98 of the outer pipe 34‴ is arranged to dump flue products into the interior of the housing 14‴, and an exhaust 36‴ is provided at the top of the housing 14‴ to direct exhaust products away from the broiler 12‴.

While the invention has been described with reference to its preferred embodiments, it will be understood that various modifications and alterations will occur to those skilled in the art from the foregoing detailed description and the accompanying drawings. For example, the lower heating assembly may, instead of a heat pipe, include an enclosure having an upwardly directed perforated plate for forming jets of flue products which impinge on the lower surface of a wall whose upper surface comprises the cooking surface. Such modifications and alterations are intended to fall within the scope of the appended claims.

What is claimed is:

1. A broiler for food products comprising:
an upper heating unit;
a burner connected to said upper heating unit and operable to deliver hot gases thereto;
a lower heating unit;
conduit means for delivering flue products from said upper heating unit to said lower heating unit; and
an exhaust in fluid communication with said lower heating unit;
said lower heating unit comprising a heat pipe assembly including an inlet for receiving flue products from said conduit means, an outlet, a cooking surface for supporting and transferring heat to said food products, gas conducting means for conveying hot gases from said inlet to said outlet, an evaporator operable to receive heat from said gas conducting means, and a condenser to deliver heat to said cooking surface, said gas conducting means including an inner pipe with a plurality of openings in its wall, said inner pipe having one end in fluid communication with said conduit means and a closed end opposite said one end, and an outer pipe surrounding said inner pipe, one end of said outer pipe in fluid communication with said exhaust, the openings in the wall of said inner pipe permitting jets of hot gases to form and impinge on the interior surface of said outer pipe to thereby transfer heat to said outer pipe;
said upper heating unit positioned generally above and spaced from said cooking surface and including a tubular member having an inlet for receiving hot gases from said burner and an outlet for delivering flue products to said conduit means.

2. A broiler as in claim 1 including an insulated housing surrounding said upper and lower heating units.

3. A broiler as in claim 1 wherein said burner comprises a gas-fired power combustion burner operable to direct burning gases into said tubular member of the upper heating unit.

4. A broiler as in claim 1 wherein said tubular member comprises a generally U-shaped radiant fire tube.

5. A broiler according to claim 1 wherein said cooking surface of said lower heating unit defines a plurality of upwardly facing grooves.

6. A broiler according to claim 1 wherein said heat pipe assembly includes an enclosure containing a working fluid sealed therein, said enclosure having one wall portion that surrounds said gas conducting means in a heat receiving relationship to form said evaporator and a second wall portion that extends generally horizontally in an opposed spaced relationship to said upper heating unit to form said condenser.

7. A broiler according to claim 6 including control means for automatically sensing the pressure of vaporized working fluid within said heat pipe assembly and for regulating the firing rate of said burner to maintain said pressure at a level within a predetermined range.

8. A broiler according to claim 1 wherein said condenser comprises a plurality of tubes each having one end in fluid communication with said evaporator and a closed end opposite said one end.

9. A broiler according to claim 8 wherein said cooking surface comprises a sheet having corrugations shaped to conform to said tubes, said sheet mounted in contact with the top portions of said tubes.

10. A broiler according to claim 1 wherein said upper heating unit comprises a heat pipe assembly.

11. A broiler for food products comprising:
an upper heating unit;

a burner connected to said upper heating unit and operable to deliver hot gases thereto;

a lower heating unit;

conduit means for delivering flue products from said upper heating unit to said lower heating unit;

said lower heating unit comprising a heat pipe assembly including an inlet for receiving flue products from said conduit means, an outlet, a cooking surface for supporting and transferring heat to said food products, said cooking surface having a set of grooves formed therein, gas conducting means for conveying hot gases from said inlet to said outlet, an evaporator operable to receive heat from said gas conducting means, and a condenser operable to deliver heat to said cooking surface;

said upper heating unit positioned generally above and spaced from said cooking surface and including a tubular member having an inlet for receiving hot gases from said burner and an outlet for delivering flue products to said conduit means;

an exhaust in fluid communication with the outlet of said lower heating unit; and a rack for placing food products onto, and removing them from said cooking surface of said lower heating unit, said rack including a grid nestable in said grooves and means for mounting said grid for movement between a first position where said grid nests in said grooves in contact with said cooking surface, and a second position where said grid is spaced from and out of contact with said cooking surface.

* * * * *